US011796800B2

United States Patent
Moore et al.

(10) Patent No.: US 11,796,800 B2
(45) Date of Patent: Oct. 24, 2023

(54) TRACKING SYSTEM

(71) Applicant: BAE SYSTEMS plc, London (GB)

(72) Inventors: David Moore, Rochester (GB); Mark Nichols, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 17/296,633

(22) PCT Filed: Dec. 3, 2019

(86) PCT No.: PCT/GB2019/053411
§ 371 (c)(1),
(2) Date: May 25, 2021

(87) PCT Pub. No.: WO2020/115466
PCT Pub. Date: Jun. 11, 2020

(65) Prior Publication Data
US 2022/0026710 A1 Jan. 27, 2022

(30) Foreign Application Priority Data

Dec. 6, 2018 (GB) ........................................ 1819896
Jan. 8, 2019 (EP) ..................................... 19150823

(51) Int. Cl.
*G02B 27/00* (2006.01)
*B63B 49/00* (2006.01)
(Continued)

(52) U.S. Cl.
CPC .......... *G02B 27/0093* (2013.01); *B63B 49/00* (2013.01); *G02B 27/017* (2013.01);
(Continued)

(58) Field of Classification Search
CPC .. G02B 27/01; G02B 27/0093; G02B 27/017; G02B 27/0172; G02B 2027/014;
(Continued)

(56) References Cited

U.S. PATENT DOCUMENTS 9,891,705 B1* 2/2018 Lahr ....................... F41G 3/225
10,223,805 B1* 3/2019 Trail ........................ G06T 7/73
(Continued)

FOREIGN PATENT DOCUMENTS

EP 3177010 A1 6/2017
EP 3363509 A1 8/2018
(Continued)

OTHER PUBLICATIONS

International Search Report and Written Opinion received for PCT Application No. PCT/GB2019/053411, dated Feb. 11, 2020. 16 pages.
(Continued)

*Primary Examiner* — Jason M Mandeville
(74) *Attorney, Agent, or Firm* — Finch & Maloney PLLC (57) ABSTRACT

A tracking system for use with a head mounted display on a watercraft is disclosed. The tracking system comprises: optical tracking circuitry to determine first tracking information of the head mounted display using optical tracking means; non-optical circuitry to determine second tracking information of the head mounted display using non-optical tracking means; and correction circuitry to determine an updated tracking information of the head mounted display based on the first tracking information and the second tracking information. The selection of at least the optical tracking means or non-optical tracking means to use to determine the first tracking information and the second tracking information is based on a location of the head mounted display.

18 Claims, 5 Drawing Sheets

(51) Int. Cl.
  *G02B 27/01* (2006.01)
  *G06F 3/01* (2006.01)
(52) U.S. Cl.
  CPC .......... *G02B 27/0172* (2013.01); *G06F 3/011* (2013.01); *G02B 2027/014* (2013.01); *G02B 2027/0187* (2013.01); *G06F 3/012* (2013.01); *G06F 3/013* (2013.01)
(58) Field of Classification Search
  CPC ... G02B 2027/0187; B63B 49/00; G06F 3/01; G06F 3/011; G06F 3/012; G06F 3/013
  USPC .......................................................... 345/156
  See application file for complete search history.

(56) References Cited

U.S. PATENT DOCUMENTS

| | | | |
|---|---|---|---|
| 2003/0210228 | A1 | 11/2003 | Ebersole et al. |
| 2004/0102676 | A1 | 5/2004 | Brendley et al. |
| 2013/0278635 | A1 | 10/2013 | Maggiore |
| 2016/0088417 | A1 | 3/2016 | Kim et al. |
| 2016/0252352 | A1* | 9/2016 | Miller ................ G06F 1/163 702/150 |
| 2017/0045941 | A1* | 2/2017 | Tokubo ................ H04S 7/304 |
| 2018/0176545 | A1 | 6/2018 | Aflaki Beni |
| 2018/0259338 | A1 | 9/2018 | Stokes et al. |
| 2019/0035152 | A1 | 1/2019 | Kazansky |
| 2022/0026218 | A1* | 1/2022 | Nichols ................ G06F 3/013 |

FOREIGN PATENT DOCUMENTS

| | | | |
|---|---|---|---|
| EP | 3395668 | A1 | 10/2018 |
| GB | 2561852 | A | 10/2018 |
| WO | 2017042588 | A1 | 3/2017 |
| WO | 2018227098 | A1 | 12/2018 |
| WO | 2018232093 | A1 | 12/2018 |
| WO | 2019143793 | A1 | 7/2019 |
| WO | 2020024909 | A1 | 2/2020 |
| WO | 2020115466 | A1 | 6/2020 |
| WO | 2020115469 | A1 | 6/2020 |

OTHER PUBLICATIONS

Search Report under Section 17(5) received for GB Application No. 1819896.0, dated May 30, 2019. 4 pages.
Combined Search and Examination Report under Sections 17 and 18(3) received for GB Application No. 1917648.6 dated Jun. 3, 2020. 6 pages.
Extended European Search Report received for EP Application No. 19150823.3, dated Jul. 1, 2019. 8 pages.
International Preliminary Report on Patentability received for PCT Application No. PCT/GB2019/053411, dated Jun. 8, 2021. 9 pages.
International Preliminary Report on Patentability received for PCT Application No. PCT/GB2019/053414, dated Jun. 8, 2021. 7 pages.
International Search Report and Written Opinion received for PCT Application No. PCT/GB2019/053414, dated Feb. 6, 2020. 14 pages.
Search Report under Section 17(5) received for GB Application No. 1819895.2, dated May 29, 2019. 3 pages.
Combined Search and Examination Report under Sections 17 and 18(3) received for GB Application No. 1917645.2, dated Mar. 5, 2021. 6 pages.
Extended European Search Report received for EP Application No. 19150822.5, dated Jul. 8, 2019. 9 pages.
Netherlands Maritime University, "Augmented reality used in navigation, Project 2 Theme: improvement and Innovation," Feb. 5, 20113. 25 pages.

* cited by examiner

TRACKING SYSTEM

BACKGROUND

Head mounted displays are a type of display that allow a user to view a scene whilst viewing information over the scene, and at the same time having freedom of movement to move their head position. Head mounted displays may comprise a tracking system. However, tracking systems are typically designed to function in a closed environment, such as an aircraft cockpit, where the freedom of movement of the user is constrained to a relatively small volume. Therefore the tracking systems are not typically capable to track movement accurately over large volumes or large movements.

DETAILED DESCRIPTION

It may be desirable for user on a watercraft to be provided with information regarding their surroundings and watercraft visually. This may be provided with a head mounted display. The information should be overlaid with objects in the field of view of the user, and therefore a tracker system is desirable for the head mounted display. However, it is also may be desirable for the user to be able to move freely about the watercraft, and to be able to view the information at a wide range of viewing angles and positons. Therefore, the tracking system should allow the user to be able to move substantially freely over a large volume whilst still being provided with information aligned with objects in their field of view. Traditionally head tracker systems have been used in applications where the user is constrained in position, for example a pilot in a cockpit.

Figure 1:
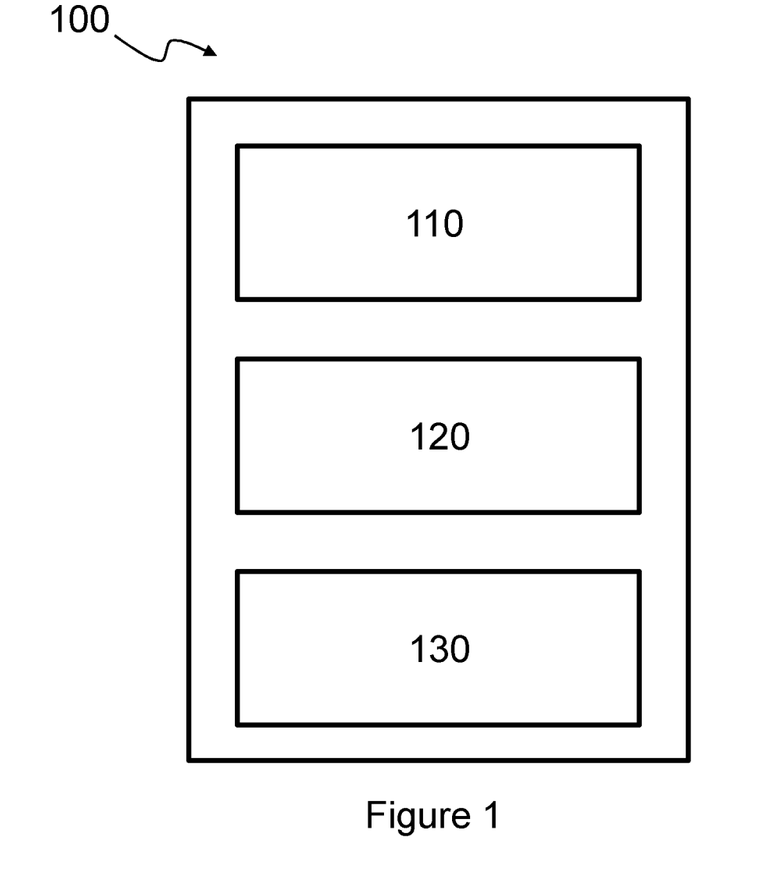
FIG. 1 illustrates a tracking system in accordance with some examples.

FIG. 1 illustrates a tracking system 100 according to some examples. Head tracking system 100 is for use with a head mounted display to track the head and/or the eyes of a user of the head mounted display on a watercraft. The tracking system 100 comprises optical tracking circuitry 110, non-optical tracking circuitry 120 and correction circuitry 130.

The optical tracking circuitry 110 determines first tracking information of the head mounted display using optical tracking means. The optical tracking means may comprise at least one optical source, such as a laser or light emitting diode, and at least one optical detector. The at least one optical source may be located on the head mounted display, or alternatively the optical detectors may be located on the head mounted display.

Non-optical tracking circuitry comprises a set of non-optical means to provide second tracking information. The set of non-optical tracking means may comprise at least one inertial sensor. The head mounted display may comprise at least one inertial sensor attached to or associated with the head mounted display, and also the watercraft may also comprise at least one inertial sensor attached to or associated with the watercraft.

Correction circuitry 130 uses the first and second tracking information to provide updated tracking information.

In some examples the tracking system 1000 may further comprise a prediction circuitry. The prediction circuitry may incorporate additional data from sources such as sensors, accelerometers and gyroscopes to improve the perceived latency and conformal accuracy of the head mounted display and use such data to predict the position of gaze, a number of frames ahead of real-time. In some examples the sensors, accelerometers and gyroscopes may be associated and/or mounted to the head mounted display. In some examples the sensors, accelerometers and gyroscopes may be associated and/or mounted to the watercraft. The prediction circuitry may preferably predict the position and gaze no more than 100 ms in advance.

In some examples the prediction circuitry may use a combination of information received from data sources associated with the watercraft and data sources associated with head mounted display. The data sources associated with the watercraft may comprise sensors, accelerometers and gyroscopes mounted to the watercraft. The data sources associated with the head mounted display may comprise sensors, accelerometers and gyroscopes mounted to the head mounted display. This combination may improve the perceived latency and accuracy of symbol conformity to objects.

For example, the watercraft may have a predictable motion due to roll caused by the motion of the sea and this information combined with information regarding the movement of the head of the user of the head mounted display further reducing the perceived latency.

The particular non-optical tracking means from the set of non-optical tracking means are selected by the tracking system 100 based on the location of the head mounted display. The tracking system 100 may select one or more than one non-optical tracking means. Selecting the non-optical tracking means based on the location of the head mounted display may allow the tracking system 100 to track the head mounted display over a large area.

In some examples the tracking system 100 selects a non-optical tracking means based on the location of the head mounted display. This is further illustrated by FIG. 2.

Figure 2:
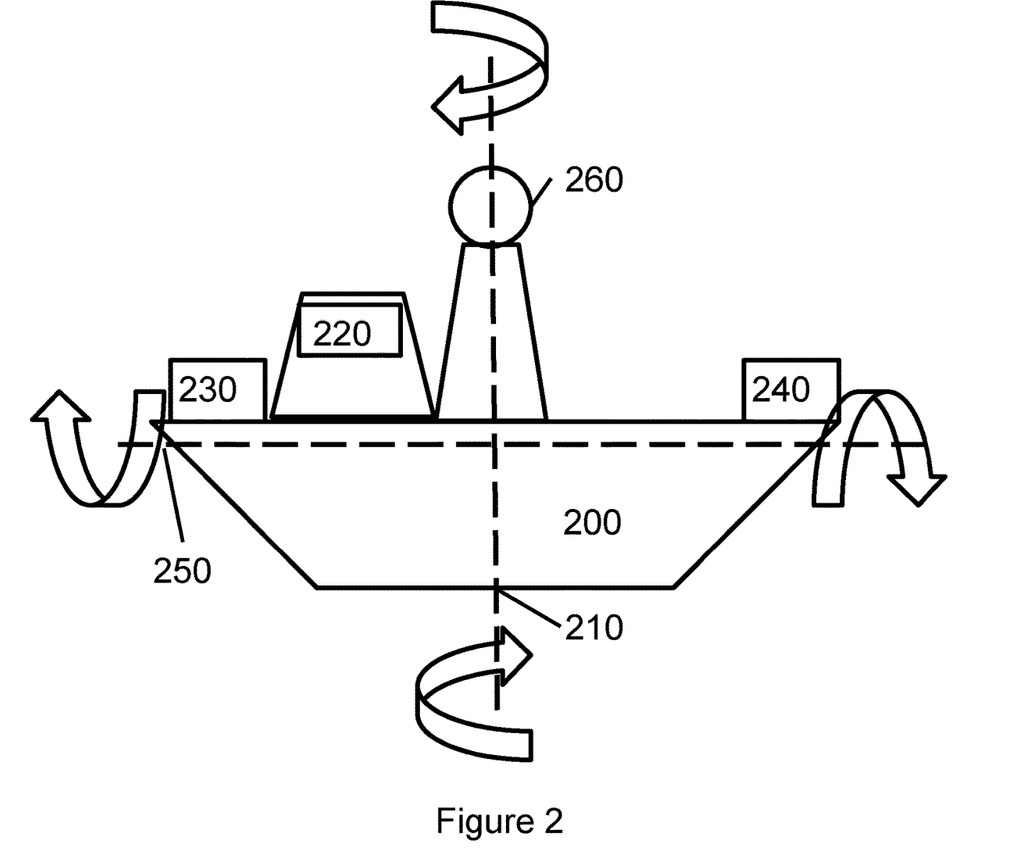
FIG. 2 illustrates a watercraft in accordance with some examples.

FIG. 2 illustrates a tracked watercraft 200 according to some examples. The tracked watercraft 200 comprises a first axis 210 and a second axis 250 about which the tracked watercraft 200 may be deformed, for example a flex, rotation, or a compression. The tracked watercraft 200 may comprise other axes not shown in FIG. 2 that it is also deformed about. Tracked watercraft 200 also comprises a first tracking location 220, second tracking location 230, and third tracking location 240. The tracked watercraft may also comprise a reference area 260. The first tracking location 220, second tracking location 230, and third tracking location 240 are each areas of the tracked watercraft that the user may be tracked.

Non-optical tracking means may be provided at least at the reference area 260. Reference area 260 may be chosen as a positon or area on the tracked watercraft 200 that is known to have the least deformation. In some examples, knowing conditions regarding the tracked watercraft may allow for calculation to be made regarding the relative movement of the first tracking location 220, second tracking location 230, and third tracking location 240, and therefore a correction may be made to the second tracking information based on the location of the user.

In some examples, at least one of the first tracking location 220, second tracking location 230, and third tracking location 240 may comprise non-optical tracking means, this may be in addition to the non-optical tracking means in the reference area 260. The selection of the non-optical tracking means may be based on the location of the head mounted display, such that the tracker system 100 uses non-optical tracking means associated with the first tracking location 220 when nearest the first tracking location, uses non-optical tracking means associated with the second tracking location 230 when nearest the second tracking location, and uses non-optical tracking means associated with the third tracking location 230 when nearest the third tracking location.

The selection of the appropriate non-optical tracking means may not be based purely on distance. For example, the tracked watercraft 200 may be known to have more flex at a certain location, and therefore the distance may be a weighted distance based on the predicted deformation of the tracked watercraft.

In some examples the deformation behaviour of the watercraft may be known, for example by modelling or physical measurements. This may enable the calculation of the second tracking information to be adapted based on the current location of the user of the head tracking system. This may counteract the fact that when the user is a distance from an inertial sensor located on the vehicle the motion of the user may different from the motion of the inertial sensor in a predictable manner due to deformation of the vehicle.

The tracker system may also take into account the motion of at least two of the first tracking location 220, second tracking location 230, third tracking location 240, and reference area 260 to such that for a known positon on the watercraft 200 a movement relative to the reference movement can be determined based on known properties of the tracked watercraft 200.

The number of tracking areas is illustrative, and the tracked watercraft 200 may comprise any number of tracked areas. In some examples the tracked areas may be discrete, such that they have defined boundaries. In some examples the tracked areas may be continuous, such that there is not a well-defined boundary. In some examples none or at least one of the tracked areas may overlap. In some examples at least one of the tracking locations may comprise a bridge of the watercraft.

In some examples the non-optical tracking means may comprise at least one inertial sensor. The non-optical tracking means may comprise a set of inertial sensors to measure movement of the helmet relative to the watercraft, and a plurality of sets of inertial sensors to measure the movement of the watercraft relative to the surroundings. The tracking system may select one of the plurality of sets of inertial sensors based on the location of the head mounted display. The plurality of sets of inertial sensors may be disjoint sets, such that each set does not share any sensor with any other set of inertial sensors.

In some examples, the optical tracking means may comprise a size-variable optical tracking mark. The physical size of the size-variable optical tracking mark may be configured to change based on the location of the head mounted display. The physical size may be based on the distance from the size-variable optical tracking mark, or from a defined position in the watercraft or tracking area. The distance may also be a weighted distance. In some examples the size of the size-variable optical tracking mark may vary such that the apparent size from the location of the head mounted display appears to be the substantially same irrespective of the distance from the size-variable optical tracking mark.

Figure 3:
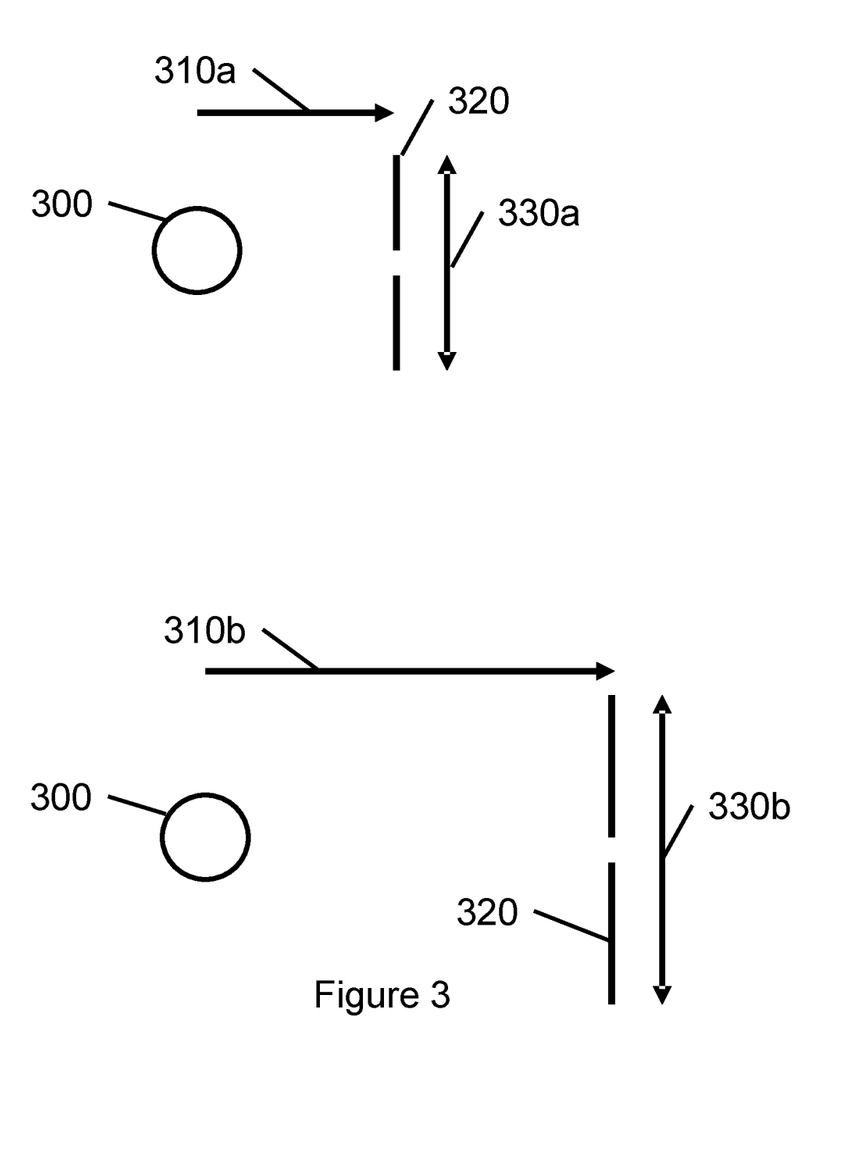
FIG. 3 illustrates a size-variable optical mark in use.

FIG. 3 illustrates the size-variable optical tracking mark in use. A head mounted display 300 is located at a first distance 310a from the size-variable optical tracking mark 320. This results in the size-variable optical tracking mark 320 having a first size 330a. When the head mounted display 300 is located at a second distance 310b from the size-variable optical tracking mark 320 the size-variable optical tracking mark 320 has a second size 330b.

The size-variable optical tracking mark may vary size mechanically, such as by expanding, contracting or a rotation.

The optical tracking marks may comprise an active device, such as a light source, or a passive device such as a reflector or a detector.

Figure 4:
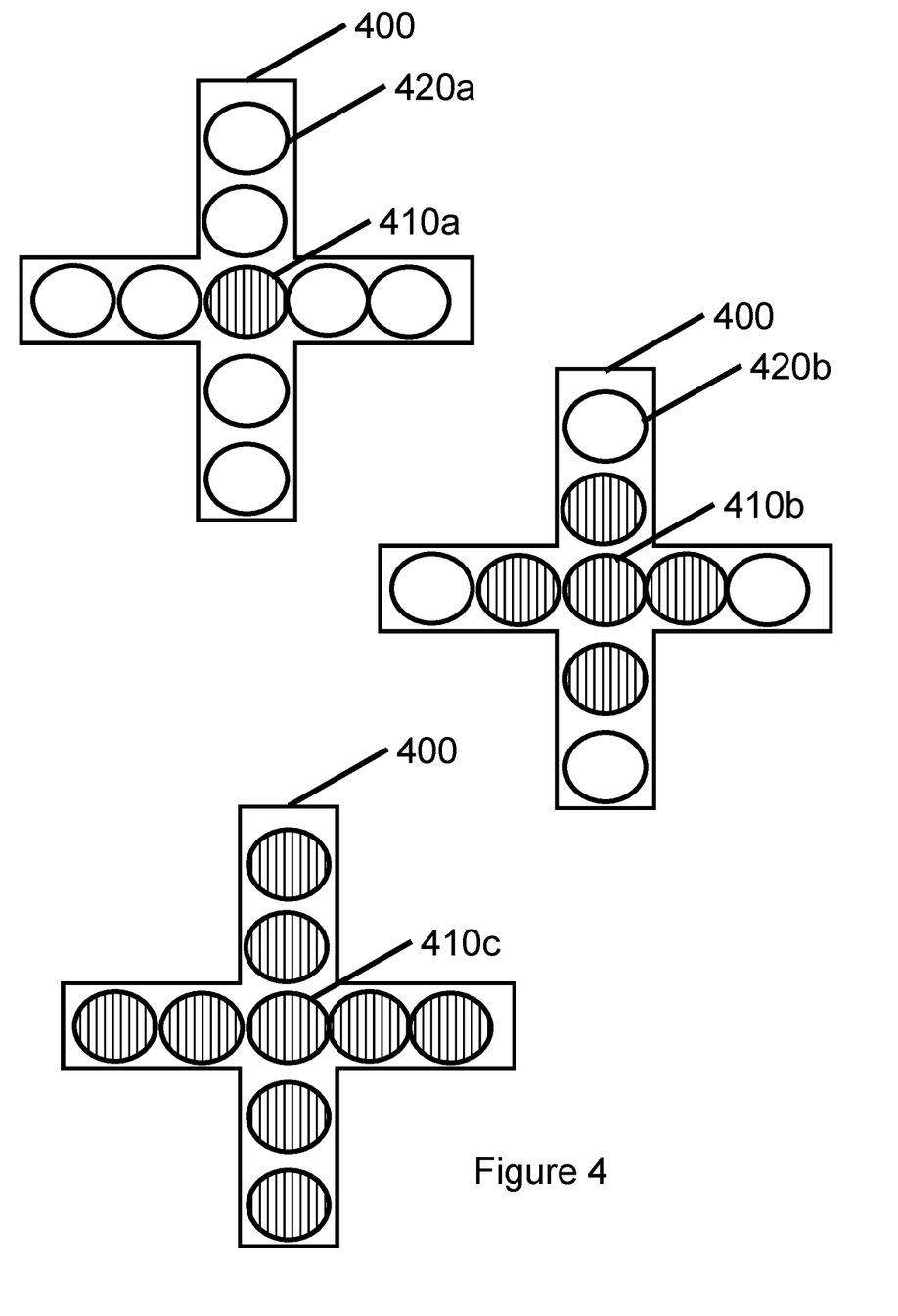
FIG. 4 further illustrates a size-variable optical mark in use.

FIG. 4 illustrates a cross-shaped size-variable optical tracking mark 400 according to some examples. The shape is illustrative, and it is understood that the size-variable optical tracking mark may have any shape. Furthermore, the size-variable optical tracking mark may be configured to increase size in all angles, rather than vertically and horizontally.

If the head mounted display is located at a first distance from the cross-shaped size-variable optical tracking mark 400, then a single optical tracking mark 410a may be used by the tracker system and six optical tracking marks not used 420a. If the head mounted display is located at a second distance from the cross-shaped size-variable optical tracking mark 400 then a further four optical tracking marks may be used 410b, and four optical tracking marks not used 420b, wherein the first distance is less than the second distance. If the head mounted display is located at a third distance from the cross-shaped size-variable optical tracking mark 400 then a further four optical tracking marks may be used 410c, and no optical tracking marks not used, wherein the third distance is more than the second and first distances.

The tracking system may also comprise a plurality of size-variable optical tracking marks and a plurality of constant-size optical tracking marks which do not change size. For example, the walls of the tracked area may comprise size-variable optical tracking marks as the user may move towards and away from the walls, but the ceiling may comprise constant-size optical tracking marks as the user may not significantly change the distance from the ceiling to the head mounted display, at least in the vertical direction.

The size-variable optical tracking marks are illustrated as increasing size from the centre, however they are not limited to increasing in this manner. The number of size-variable marks is not required to increase with distance of the user form the marks. In some examples the number of size-variable tracking marks may stay constant, such that the spacing of the marks increase with increasing distance of the user from the marks.

In some examples the intensity of the marks may depend on the distance of the user from the mark. In some examples the intensity of the mark may be relatively constant with distance.

Figure 5:
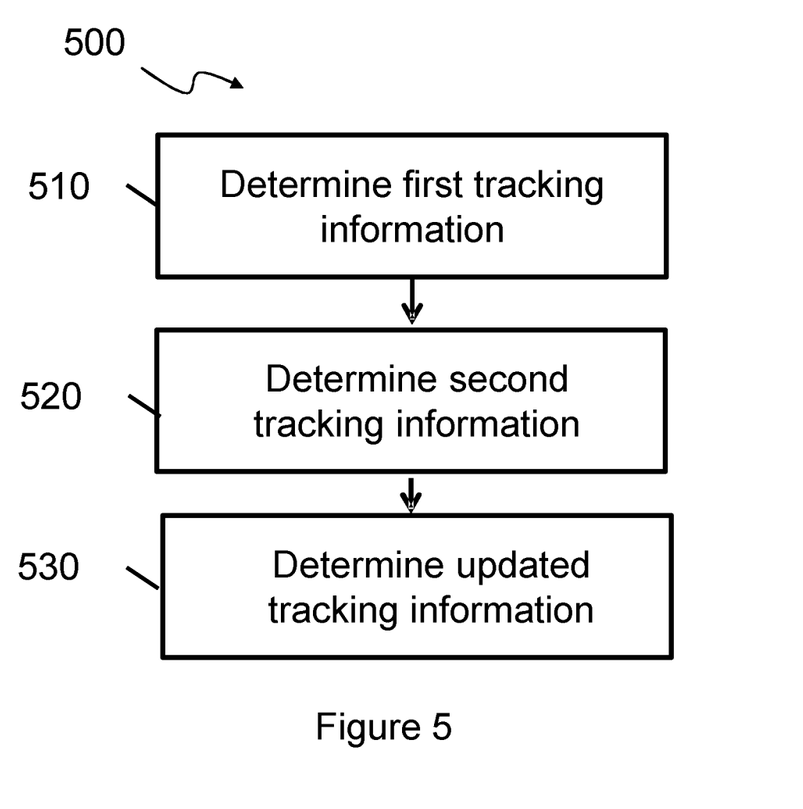
FIG. 5 illustrates a method for use with a tracking system in accordance with some examples.

FIG. 5 illustrates a method 500 according to some examples. The method comprises determining first tracking information 510, determining second tracking information 520, and determining updated tracking information 530.

Determining first tracking information 510 comprises using optical tracking means to determine the first tracking information using optical tracking means. The optical tracking means may comprise at least one optical sensor and at least one optical source. The optical detectors may be located on the head mounted display, or the optical sources may be located on the head mounted display.

Determining second tracking information 520 comprises using non-optical tracking means to determine the second tracking information using non-optical tracking means.

The selection of at least one of the optical tracking means and non-optical tracking means may be based on the location of the head mounted display.

In some examples the method may comprise selecting a non-optical tracking means based on the location of the head mounted display. A watercraft may comprise a plurality of tracked areas, and the selecting the non-optical tracking means may comprise selecting a subset of the non-optical tracking means, the subset of the non-optical tracking means being closest to the head mounted display.

In some examples the method may comprise providing the location of the head mounted display to the optical means, and basing the size of the variable-sized marks on the distance from the variable-sized mark to the head mounted display. The location of the head mounted display may be a rough estimation. In some examples the tracking system may determine the location by performing a measurement. In some examples the location may be a relative location, such that the location provides information regarding the distance from the size-variable optical tracking mark but does not provide the absolute location of the head mounted display on the watercraft.

Although the above examples are described in relation to watercraft, it should be understood that tracking system 100 may be used with any type of application where a user's head is required to be tracked over a large volume.

The invention claimed is:

1. A tracking system for use with a head mounted display on a watercraft, the tracking system comprising:
   optical tracking circuitry to determine first tracking information of the head mounted display using optical tracking means, the optical tracking means including a configurable optical tracking mark;
   non-optical circuitry to determine second tracking information of the head mounted display using at least one non-optical tracking means of a set of non-optical tracking means, the at least one non-optical tracking means including a sensor; and
   correction circuitry to determine an updated tracking information of the head mounted display based on the first tracking information and/or the second tracking information;
   wherein the tracking system is configured to select the at least one non-optical tracking means of the set of non-optical tracking means based on a location of the head mounted display; and
   wherein the tracking system is configured to vary a physical size and/or configuration of the configurable optical tracking mark, based on the location of the head mounted display relative to the configurable optical tracking mark, such that an apparent size of the configurable optical tracking mark from the location of the head mounted display appears to be substantially the same, irrespective of a distance of the head mounted display from the configurable optical tracking mark.

2. The tracking system according to claim 1, wherein the set of non-optical tracking means comprises a plurality of disjoint sets of inertial sensors located on the watercraft, each individual set comprising at least one inertial sensor, each disjoint set located in one or more separate locations of the watercraft, wherein the tracking system is configured to select one of the plurality of disjoint sets of inertial sensors for use in determining the second tracking information based on the location of the head mounted display.

3. The tracking system according to claim 1, wherein the optical tracking means comprises at least one light source.

4. The tracking system according to claim 3, wherein the at least one light source comprises a light emitting diode.

5. The tracking system according to claim 1, wherein the non-optical circuitry is configured to adapt the determination of the second tracking information based on an estimate of physical deformation at the location of the head mounted display.

6. The tracking system according to claim 5, wherein the estimate of physical deformation is based upon non-optical tracking means at at least two separate locations, and wherein the tracking system further comprises gaze prediction circuitry.

7. A watercraft comprising the tracking system of claim 1.

8. The tracking system according to claim 1, wherein the physical size and/or configuration of the size-variable optical tracking mark is varied based further on a distance between the head mounted display and the size-variable optical tracking mark.

9. A method for use with a tracking system, the tracking system for use with a head mounted display on a watercraft, the method comprising:
   determining first tracking information of a head mounted display based on optical tracking means, the optical tracking means comprising a plurality of optical tracking marks;
   selecting at least one of the optical tracking marks used for determining the first tracking info, based on a location of the head mounted display relative to the plurality of optical tracking marks;
   selecting at least one non-optical tracking means of a set of non-optical tracking means, based on the location of the head mounted display, the at least one non-optical tracking means including a sensor;
   determining second tracking information of the head mounted display based on the at least one non-optical tracking means of the set of non-optical tracking means and an estimate of physical deformation at the location of the head mounted display; and
   determining an updated tracking information of the head mounted display based on the first tracking information and/or the second tracking information.

10. The method according to claim 9, wherein the set of non-optical tracking means comprises a plurality of disjoint sets of inertial sensors located on the watercraft, each individual disjoint set comprising at least one inertial sensor, each disjoint set located in one or more separate locations of the watercraft, and selecting the at least one non-optical tracking means comprises selecting one of the disjoint sets of inertial sensors based on the location of the head mounted display.

11. The method according to claim 9, wherein the plurality of optical tracking marks comprises at least one variable-sized mark, a size and/or configuration of the at least one variable-sized mark is based on the location of the head mounted display.

12. The method according to claim 9, wherein the estimate of physical deformation is based upon non-optical tracking means at at least two separate locations.

13. The method according to claim 9, wherein the number of the optical tracking marks used for determining the first tracking info is based further on a distance between the head mounted display and at least one of the plurality of optical tracking marks.

14. A non-transitory machine readable medium comprising instructions, that when executed by one or more processors, cause a process to be carried out for use with a tracking system, the tracking system for use with a head mounted display on a watercraft, the process comprising:

determining first tracking information of a head mounted display based on an optical tracking mark;

selecting at least one non-optical tracking sensor of a set of non-optical tracking sensors, based on a location of the head mounted display;

determining second tracking information of the head mounted display based on the at least one non-optical tracking sensor and on an estimate of physical deformation of the watercraft at the location of the head mounted display; and     determining an updated tracking information of the head mounted display based on the first tracking information and/or the second tracking information.

15. The non-transitory machine readable medium according to claim 14, wherein the set of non-optical tracking sensors includes a plurality of disjoint sets of inertial sensors located on the watercraft, each individual disjoint set including at least one inertial sensor, each disjoint set located in a separate location of the watercraft, and selecting the at least one non-optical tracking sensor includes selecting one of the disjoint sets of inertial sensors based on the location of the head mounted display.

16. The non-transitory machine readable medium according to claim 14, wherein the optical tracking mark comprises at least one variable-sized mark, a size and/or configuration of the at least one variable-sized mark being based on the location of the head mounted display.

17. The non-transitory machine readable medium according to claim 14, wherein the set of non-optical tracking sensors includes a first non-optical tracking sensor at a first location and a second non-optical tracking sensor at a second location, and the estimate of physical deformation is based upon first and second non-optical tracking sensors.

18. A watercraft comprising the non-transitory machine readable medium of claim 14.

\* \* \* \* \*